(12) United States Patent
Sotom et al.

(10) Patent No.: US 10,003,400 B2
(45) Date of Patent: Jun. 19, 2018

(54) INTER-SATELLITE COMMUNICATION DEVICE, ASSOCIATED SATELLITE AND ASSOCIATED CONSTELLATION OF SATELLITES

(71) Applicant: THALES, Courbevoie (FR)

(72) Inventors: Michel Sotom, Toulouse (FR); Arnaud Le Kernec, Toulouse (FR); Agnès Francastel, Toulouse (FR); Dominique Potuaud, Toulouse (FR); Gilles Fernandez, Toulouse (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/586,862

(22) Filed: May 4, 2017

(65) Prior Publication Data
US 2017/0324465 A1   Nov. 9, 2017

(30) Foreign Application Priority Data

May 4, 2016   (FR) ..................................... 16 00741

(51) Int. Cl.
*H04B 10/00*   (2013.01)
*H04B 7/185*   (2006.01)
*H04B 10/29*   (2013.01)
*H04B 10/40*   (2013.01)

(52) U.S. Cl.
CPC ..... *H04B 7/18521* (2013.01); *H04B 7/18513* (2013.01); *H04B 10/29* (2013.01); *H04B 10/40* (2013.01)

(58) Field of Classification Search
USPC ................................................. 398/121–124
See application file for complete search history.

(56) References Cited

U.S. PATENT DOCUMENTS

| | | | | |
|---|---|---|---|---|
| 5,592,320 A * | 1/1997 | Wissinger | ............ | H04B 10/118 398/121 |
| 5,710,652 A * | 1/1998 | Bloom | ................ | H04B 10/118 398/129 |
| 6,246,501 B1 * | 6/2001 | Dreischer | .......... | H04B 7/18521 398/122 |
| 6,535,314 B1 * | 3/2003 | Mendenhall | ......... | H04B 10/118 250/491.1 |
| 7,297,934 B2 * | 11/2007 | Kane | ..................... | G01S 17/023 250/206 |

(Continued)

*Primary Examiner* — Agustin Bello
(74) *Attorney, Agent, or Firm* — Baker & Hostetler LLP

(57) ABSTRACT

An inter-satellite communication device for satellites orbiting within a constellation of satellites comprises at least one optical terminal dedicated to intra-orbital plane communication links and at least one optical terminal dedicated to inter-orbital plane communication links, each optical terminal dedicated to intra-orbital plane communications configured to transmit and receive optical signals with an optical terminal of an identical satellite orbiting in the same orbital plane, each optical terminal dedicated to inter-orbital plane communications configured to transmit and receive optical signals with an optical terminal of an identical satellite in an orbital plane adjacent over the entirety of its orbit in its orbital plane and each optical terminal dedicated to inter-orbital plane communications having a field of regard such that the half-angle at the vertex of the latter is larger than the maximum value of the azimuthal angle over a revolution around the Earth.

14 Claims, 9 Drawing Sheets

(56) References Cited

U.S. PATENT DOCUMENTS

| | | | | |
|---|---|---|---|---|
| 7,609,972 B2* | 10/2009 | Cunningham | ..... | H04B 10/1127 |
| | | | | 398/118 |
| 2004/0057730 A1* | 3/2004 | Littlejohn | ............ | H04B 10/112 |
| | | | | 398/156 |
| 2007/0031151 A1* | 2/2007 | Cunningham | ..... | H04B 10/1123 |
| | | | | 398/131 |
| 2008/0118247 A1* | 5/2008 | Drago | .................. | H04B 10/118 |
| | | | | 398/122 |
| 2010/0046953 A1* | 2/2010 | Shaw | ...................... | H01S 5/423 |
| | | | | 398/115 |
| 2010/0126335 A1* | 5/2010 | Saban | .................... | F41G 7/224 |
| | | | | 89/36.01 |
| 2010/0220390 A1* | 9/2010 | Wein | ......................... | F41G 3/22 |
| | | | | 359/429 |
| 2014/0226968 A1* | 8/2014 | Cook | .................. | H04B 10/118 |
| | | | | 398/9 |
| 2016/0255253 A1* | 9/2016 | Kelchner | ................. | F41G 3/22 |
| | | | | 348/135 |
| 2017/0324465 A1* | 11/2017 | Sotom | ............... | H04B 7/18521 |

* cited by examiner

Direction of movement $\theta_m = \arccos((D + \Phi)/2d)$

Direction of movement of the satellite

INTER-SATELLITE COMMUNICATION DEVICE, ASSOCIATED SATELLITE AND ASSOCIATED CONSTELLATION OF SATELLITES

CROSS-REFERENCE TO RELATED APPLICATIONS

This application claims priority to foreign French patent application No. FR 1600741, filed on May 4, 2016, the disclosure of which is incorporated by reference in its entirety.

FIELD OF THE INVENTION

The present invention relates to the field of telecommunication by satellite. The invention more particularly relates to an inter-satellite communication device for satellites belonging to a constellation of satellites.

The invention may be applied to constellations of satellites requiring links between satellites of one and the same orbital plane and/or links between satellites belonging to different orbital planes. By way of illustration, FIG. 1 shows an example of a constellation of satellites 10 according to the invention, along with their inter-satellite links 11. In a non-limiting manner, this may be a constellation of telecommunication satellites 10 in non-geostationary orbits, such as low Earth orbits (LEO) or medium Earth orbits (MEO), which are required to provide very high speed, low latency connections between users on the ground. These constellations are built up on the basis of multiple orbital planes, with multiple satellites following a near-circular orbit in each orbital plane. Satellite constellations may be polar or near-polar constellations, their orbital planes passing over or in proximity to the two poles.

BACKGROUND

FIG. 2 is a close-up of FIG. 1 illustrating links 11 between the satellites within the constellation. These links 11 may be between satellites 10 belonging to one and the same orbital plane 25, in which case intra-plane links 21 are spoken of, or between satellites 10 belonging to adjacent orbital planes 25, which are referred to as inter-plane links 22. Each satellite is thus linked to a maximum of four satellites 10. In FIG. 2, if the direction of movement of the satellites is taken as a reference, a satellite 10 may be linked to the two neighbouring satellites following the same orbital plane in front of and behind it, and to the two neighbouring satellites following the adjacent orbital planes 25 to the right and to the left of the satellite 10.

In order to establish the links between them, certain satellites 10 comprise inter-satellite communication terminals employing radiofrequency technologies. These satellites 10 make use of antennas dedicated to intra-orbital plane communications 21 and inter-orbital plane communications 22. By way of illustration, FIG. 3 shows an example of one embodiment of a platform 30 of such a satellite known from the prior art. This platform comprises two mobile antennas 32 for the inter-plane links 22 and two antennas with low mobility 31 for the intra-plane links 21.

These inter-satellite links 11, when employing radiofrequency technology, pose multiple problems in the case of use within a polar or near-polar constellation. Certain problems occur in particular due to the fact that the azimuthal angle of an inter-plane link 22 varies constantly with latitude over the course of the orbit and that the speed of variation of the azimuthal angle increases substantially as the two satellites approach the pole. Other problems arise from the fact that it is necessary to avoid possible interference between all of the beams present at the pole. In practice, inter-orbital plane links 22 cannot be sustained at extreme latitudes, typically those latitudes higher than about 60° and lower than about −60°, and must therefore be broken. Inter-satellite communication terminals are placed and oriented so as to establish links with the satellite to the right or to the left (with respect to the direction of movement) and are capable of aiming in a given azimuthal angular sector corresponding to these latitudes. Communications between satellites in neighbouring orbital planes 25 are therefore no longer available beyond these latitude values when the satellites pass over the polar regions.

One consequence is that a new inter-plane connection 21 must be established after crossing the pole and that this connection is not made with the same satellite. Specifically, with reference to FIG. 4, considering a satellite 10 orbiting in the central orbital plane 25, this satellite 10 is linked to two other satellites 10 that are placed in neighbouring orbital planes 25 on either side of the central orbital plane 25. In the polar regions, the orbital planes 25 cross one another and the satellite 10 which was located to the right of the satellite in question (taking the direction of movement of the satellites as a reference and seen from above with respect to Earth) will be located to the left of the satellite in question after passing over the pole. The same applies for the satellite 10 which was located to the left before passing over the pole. As soon as the satellite 10 has crossed the polar region, i.e. its latitude is higher than about 60° or lower than about −60° depending on the pole crossed, the inter-satellite communication terminals re-establish the inter-orbital plane links 22 with the satellites 10 of the neighbouring orbital plane 25. However, each terminal re-establishes the link 22 with a different satellite 10 with respect to the moment at which said link 22 was broken. For example, the inter-satellite communication terminal that was positioned on the platform for connection with the satellite to the right before passing over the pole will have to re-establish the inter-plane link 22 with the new satellite that is located to its right and which was previously to its left. This makes the procedure somewhat more complicated, all the more so if these breaking and re-establishing operations have to be carried out twice per orbit.

SUMMARY OF THE INVENTION

One aim of the invention is, in particular, to remedy all or some of the drawbacks of the prior art by proposing a solution that makes it possible to avoid the inter-orbital plane links being broken at the poles.

To this end, one subject of the invention is a communication device for satellites configured to orbit within a constellation of satellites, a satellite comprising a satellite platform, said device comprising a group of at least one optical terminal dedicated, under nominal conditions, to intra-orbital plane communication links and a group of at least one optical terminal dedicated, under nominal conditions, to inter-orbital plane communication links, each optical terminal dedicated to intra-orbital plane communications being configured to transmit and receive optical signals with an optical terminal of an identical satellite orbiting in the same orbital plane, each optical terminal dedicated to inter-orbital plane communications being configured to transmit and receive optical signals with an optical terminal of an identical satellite in an orbital plane that is adjacent over the entirety of its orbit in its orbital plane and each optical terminal dedicated to inter-orbital plane communications having a field of regard such that the half-angle at the vertex $\theta_m$ of the latter is larger than the absolute maximum value of the azimuthal angle $\theta$ of the inter-orbital plane link over a revolution around the Earth.

According to one embodiment, the device comprises at least four optical inter-satellite link terminals, a first group of two optical terminals being located at the front of said satellite and a second group of two optical terminals being located at the rear of said satellite, each group of optical terminals comprising one optical terminal dedicated, under nominal conditions, to intra-orbital plane communication links and one optical terminal dedicated, under nominal conditions, to inter-orbital plane communication links, the two optical inter-satellite link terminals of one and the same group being separated by a predetermined distance such that the optical beam of the inter-orbital plane communication link is never occulted by another optical terminal of the satellite platform during its orbit in the orbital plane.

According to one embodiment, the two optical terminals of each group are placed in a position that is symmetrical with respect to an axis that is parallel to the direction of the trajectory of the satellite.

According to one embodiment, the optical terminals are identical and interchangeable.

According to one embodiment, the intra-plane and inter-plane communication links are transmitted and received in a band of wavelengths that is divided into two sub-bands, the optical terminals of the first group transmitting optical beams in the first sub-band and receiving optical beams in the second sub-band, the optical terminals of the second group transmitting optical beams in the second sub-band and receiving optical beams in the first sub-band.

According to one embodiment, the intra-plane and inter-plane communication links are transmitted and received with two different polarizations, the optical terminals of the first group transmitting optical beams with a first type of polarization and receiving optical beams with the second type of polarization, the optical terminals of the second group transmitting optical beams with the second type of polarization and receiving optical beams with the first type of polarization.

According to one embodiment, optical beams are transmitted and received in the optical C-band.

According to one embodiment, optical beams are transmitted and received in the optical L-band.

According to one embodiment, the satellite follows a non-stationary orbit.

Another subject of the invention is a satellite configured to orbit within a constellation of satellites distributed in multiple orbital planes, said satellite comprising a satellite platform on which an inter-satellite communication device as described above is positioned.

Another subject of the invention is a constellation of satellites comprising a plurality of satellites as described above.

According to one embodiment, the satellites follow a non-stationary orbit.

According to one embodiment, the satellites follow a low Earth orbit.

According to one embodiment, the satellites follow a medium Earth orbit.

BRIEF DESCRIPTION OF THE DRAWINGS

Other particularities and advantages of the present invention will become more clearly apparent upon reading the description which follows, given by way of non-limiting illustration and with reference to the appended drawings, in which.

DETAILED DESCRIPTION

Figure 1:
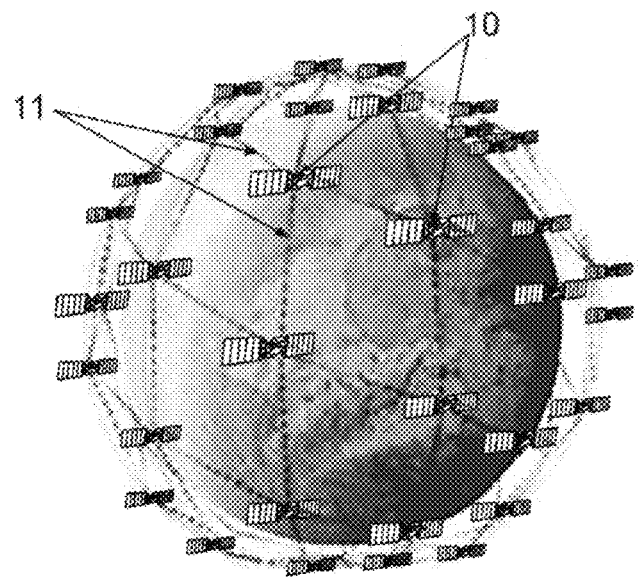
FIGS. 1 and 2, which have already been presented, illustrate an example of a constellation of satellites and a close-up of the latter, respectively.
Figure 2:
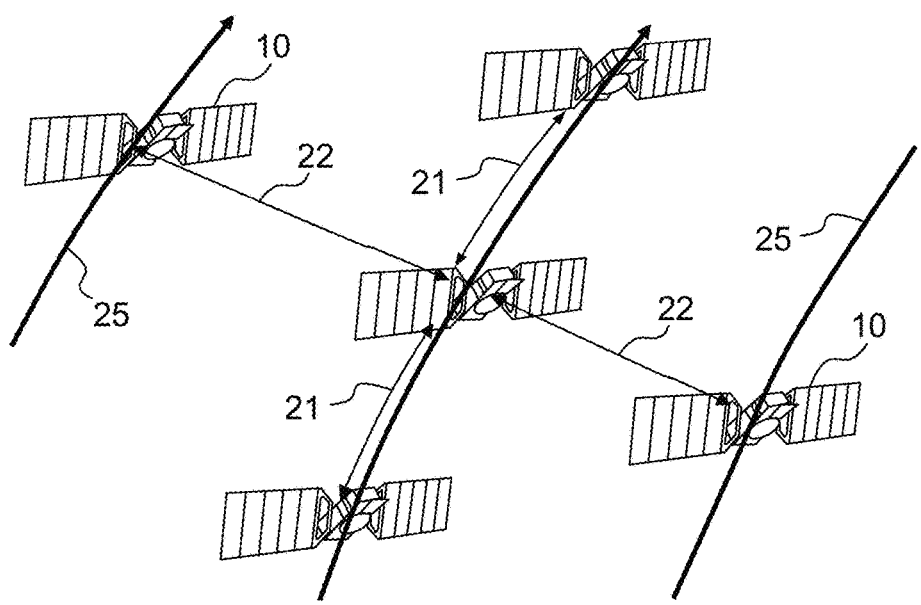
Figure 3:
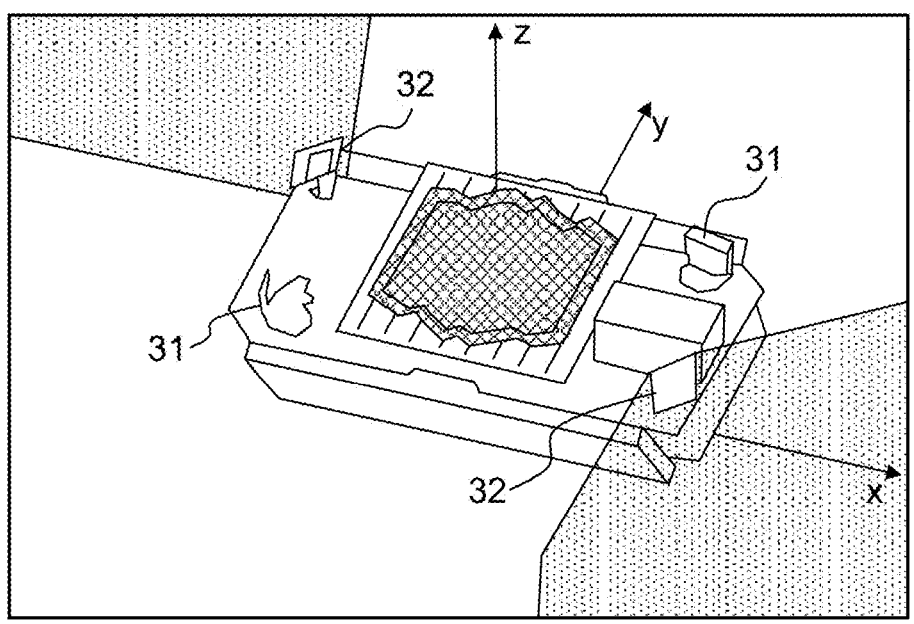
FIG. 3, which has already been presented, shows an example of one embodiment of a satellite platform known from the prior art.
Figure 4:
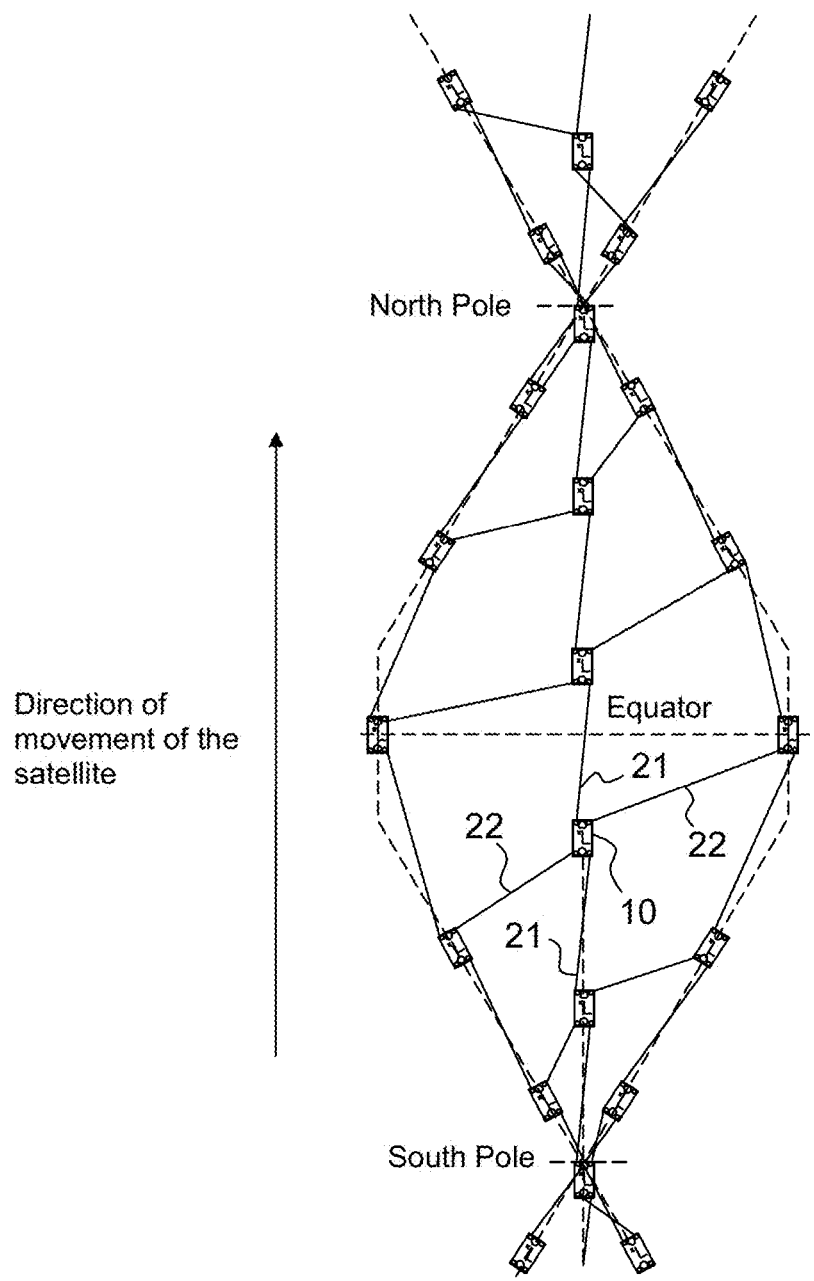
FIG. 4, which has already been presented, shows an example of change in inter-satellite links using radiofrequency inter-satellite link terminals, known from the prior art, in the vicinity of a pole.

Throughout the remainder of the text, a view from above with respect to Earth will be considered, and the direction of movement of the satellites will be taken as a reference when referring to the front and rear, and the left and right, of the latter.

An inter-satellite communication device comprises at least one optical terminal dedicated, under nominal conditions, to intra-orbital plane communication links 21 and at least one optical terminal dedicated, under nominal conditions, to inter-orbital plane communication links 22. Each optical terminal dedicated to intra-orbital plane communications 21 is configured to transmit and receive optical signals with an optical terminal of an identical satellite 10 orbiting in the same orbital plane 25, and each optical terminal dedicated to inter-orbital plane communications 22 is configured to transmit and receive optical signals with an optical terminal of an identical satellite 10 in an orbital plane 25 that is adjacent over the entirety of its orbit in its orbital plane 25.

Figure 5A:
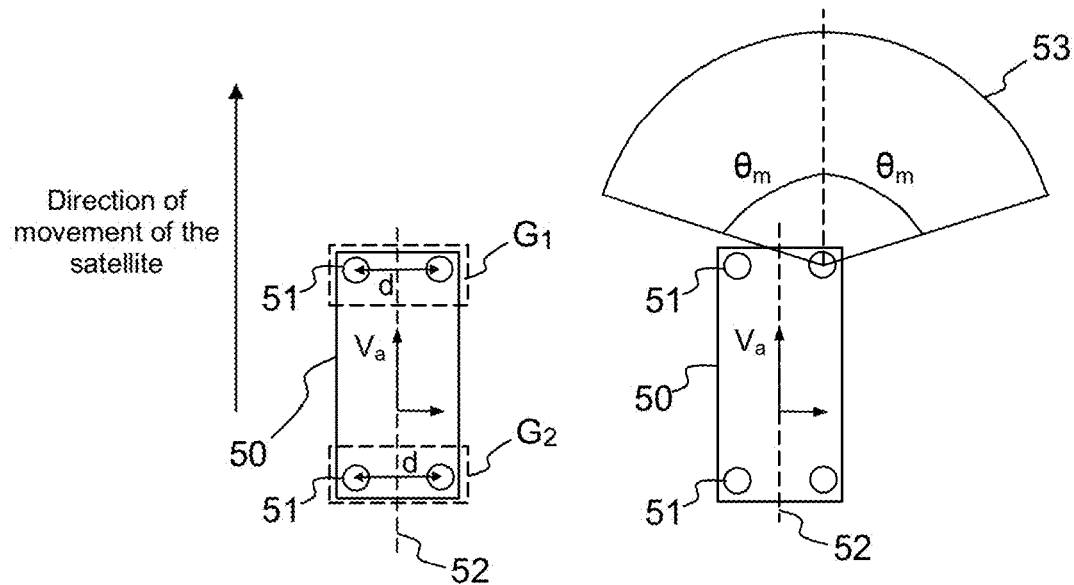
FIGS. 5a and 5b show examples of embodiments of a satellite platform according to the invention.
Figure 5B:
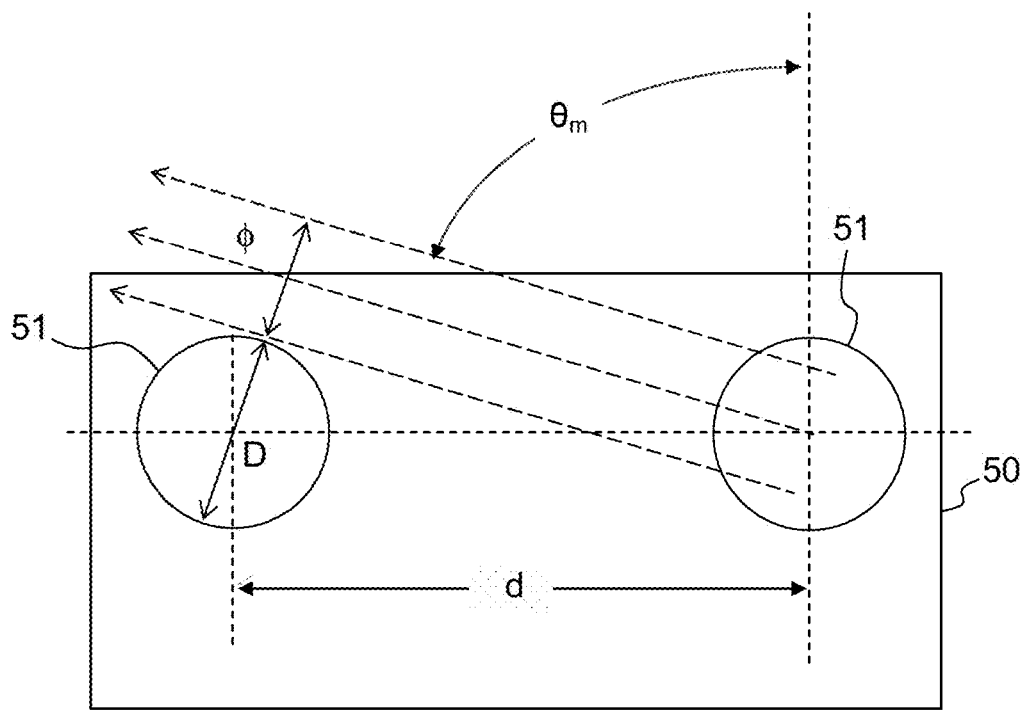

FIGS. 5a and 5b show examples of embodiments of an inter-satellite communication device according to the invention. This system may be installed on the platform 50 of a telecommunications satellite 10, i.e. the structure grouping together the navigation and structural elements of the satellite, said satellite being configured to orbit within a constellation of satellites. This constellation may be a polar or near-polar constellation. The constellation comprises multiple orbital planes 25 and each orbital plane comprises multiple satellites 10.

According to one embodiment, the inter-satellite communication device may comprise two groups G1, G2 of optical inter-satellite link 11 terminals 51. A first group of two optical terminals 51 may be located at the front of the platform 50 of the satellite 10 and a second group of terminals 51 may be located at the rear of the platform 50 of the satellite. Each group G1, G2 of optical terminals 51 comprises an optical terminal 51 configured to establish, under nominal conditions, an intra-orbital plane communication link 21 between the satellite 10 in question and another, adjacent satellite 10 orbiting in the same orbital plane 25, and an optical inter-satellite link 11 terminal 51 configured to establish, under nominal conditions, an inter-orbital plane communication link between the satellite 10 in question and another, neighbouring satellite 10 orbiting in an adjacent orbital plane 25.

The optical intra-plane link 21 terminal 51 placed at the front of the satellite platform 10 in question is configured to establish a communication link with the optical terminal 51 of the adjacent satellite 10 orbiting in front thereof. Similarly, the optical intra-plane link 21 terminal 51 placed at the rear of the satellite platform in question is configured to establish a communication link with the optical intra-plane link 21 terminal 51 of the adjacent satellite orbiting therebehind.

According to one preferred embodiment, the two optical inter-satellite link 11 terminals 51 of each group G1, G2 are placed in a position that is substantially symmetrical with respect to an axis 52 that is parallel to the direction of the trajectory of the satellite 10 and passes through the centre of the platform 50. Advantageously, this particular positioning of the terminals 51 allows the latter to be redundant and hence to carry out the same functions. Moreover, this allows the terminals 51 to have the same field of regard 53.

This redundancy may also be obtained for slightly asymmetrically positioned terminals 51.

In FIGS. 5a and 5b, the optical terminals 51 of one and the same group G1, G2 are aligned along an axis that is substantially perpendicular to the direction of movement of the satellite. This configuration is in no way limiting and these terminals may be offset with respect to an axis that is substantially perpendicular to the direction of movement of the satellite.

The two terminals 51 of each group G1, G2 may be spaced apart by a predetermined distance d. The value of this distance d is chosen such that the communication link between the optical inter-plane link 22 terminal 51 in question and the optical terminal 51 of the adjacent satellite to which it is linked is never masked and hence never broken regardless of the position of said neighbouring satellite 10 in the adjacent orbital plane 25.

With reference to FIG. 5b, if the optical terminal 51 is considered to be defined by a cylindrical envelope, the half-angle at the vertex $\theta_m$ of the field of regard 53 of the optical terminal, with respect to a straight line that is parallel to the direction of the trajectory of the satellite 10, is given as a function of the distance d separating the two optical terminals, of their external diameter D and of the diameter φ of the optical beam by the expression:

$$\theta_m = \arccos((D+\varphi)/2d).$$

The value of the distanced separating the two optical terminals 51 is chosen in particular according to the orbit, to the number of orbital planes 25 of the constellation and to the number of satellites 10 per orbital plane 25. The value of this distance d may be determined such that the field of regard 53 of the optical inter-plane link terminal 51 is as wide as possible and such that said field of regard 53 allows said optical terminal 51 to maintain its link with the neighbouring satellite, in particular in the polar regions when said neighbouring satellite 10 in the adjacent orbital plane 25 passes from one side of the satellite 10 in question to another.

This particular position of the optical inter-satellite link 11 terminals 51 allows all of the intra-plane 21 and inter-plane 22 links to be maintained without interruption, in particular when the satellites 10 cross the poles. This avoids having to re-establish the inter-plane link 22 after crossing the polar regions. This also avoids having to continuously update the connectivity of the constellation. Each satellite 10 remains connected to the same satellites via the same optical terminals 51 over the entirety of its orbit.

Moreover, each satellite 10 of the constellation is always in communication with the same satellites 10 and thus the connectivity of the system as a whole always stays the same. Additionally, maintaining the inter-satellite links 11 without interruption makes it possible always to ensure a maximum bit rate for traffic, communications between subscribers on the ground.

Another advantage of the inter-satellite communication 11 device according to the invention resides in the fact that the two optical inter-satellite link 11 terminals 51 of each group G1, G2 are identical and hence interchangeable. Each of the two optical terminals 51 may be configured to operate equally as an inter-plane link terminal 22 and as an intra-plane link terminal 21. Thus, when one of the two optical terminals 51 fails, the remaining optical terminal may be reconfigured to replace the faulty optical terminal 51 if the function of the latter is more critical. Moreover, since the two optical terminals 51 are identical, this changeover of function may be achieved by means of software and hence require no reconfiguration of hardware. This allows reconfiguration to be easier and more flexible and makes it possible for it to be carried out remotely from the ground.

Figure 5C:
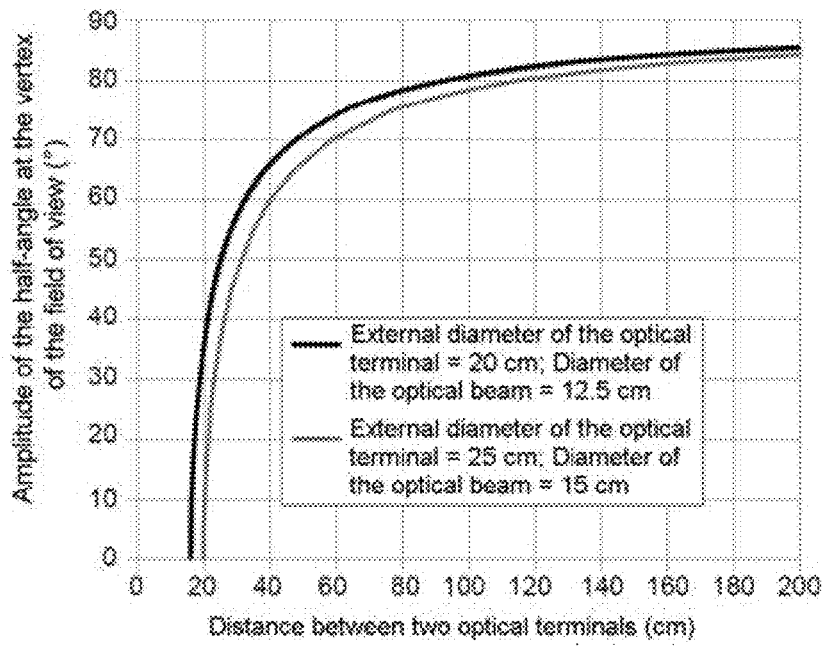
FIG. 5c is a graphical representation of the value of the amplitude of the field of regard as a function of the distance between two optical terminals.

By way of illustration, FIG. 5c shows the value of the amplitude of the half-angle at the vertex $\theta_m$ of the field of regard as a function of the distance between two optical terminals 51 for two particular configurations. In one particular configuration, the external diameter D of the optical terminal 51 is 20 cm and the diameter φ of the optical beam is 12.5 cm. In a second configuration, the external diameter D of the optical terminal 51 is 25 cm and the diameter φ of the optical beam is 15 cm.

Figure 6A:
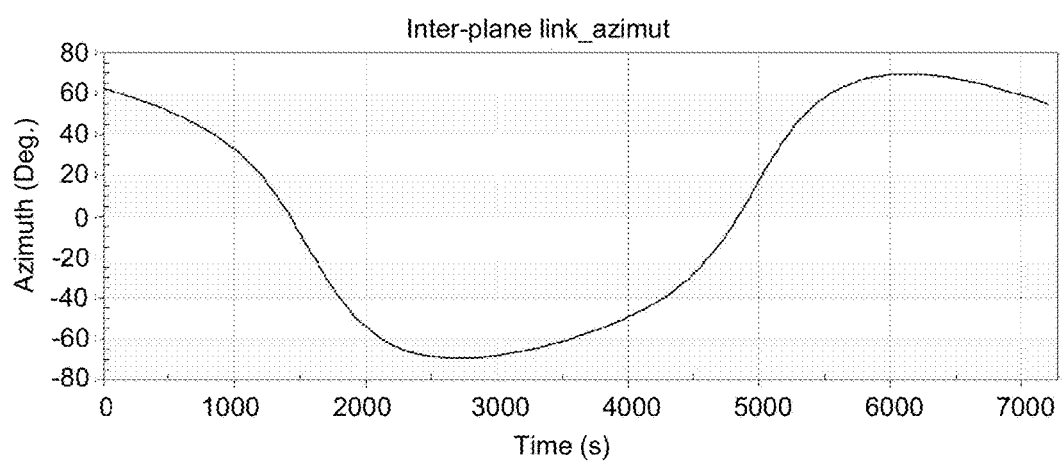
FIG. 6a is a graphical representation of the change in the azimuth of an inter-plane link as a function of time.

FIG. 6a is a graphical representation illustrating the change, as a function of time, in the azimuth of an inter-plane link 22 for a given constellation having multiple orbital planes 25 and multiple satellites 10 per orbital plane 25, the azimuthal angle being defined with respect to the direction of movement of the satellites. In this example, each satellite 10 completes its orbit in an interval of time T of about 110 minutes and the azimuth θ varies between about −75° and +75°. Thus, for this configuration, the field of regard 53 of the optical inter-plane link 22 terminal 51 must therefore at least cover this range of values. The azimuth of the inter-plane link 22 passes through zero when the satellites 10 cross one other at the poles and through extrema when the satellite 10 passes over the Equator.

Figure 6B:
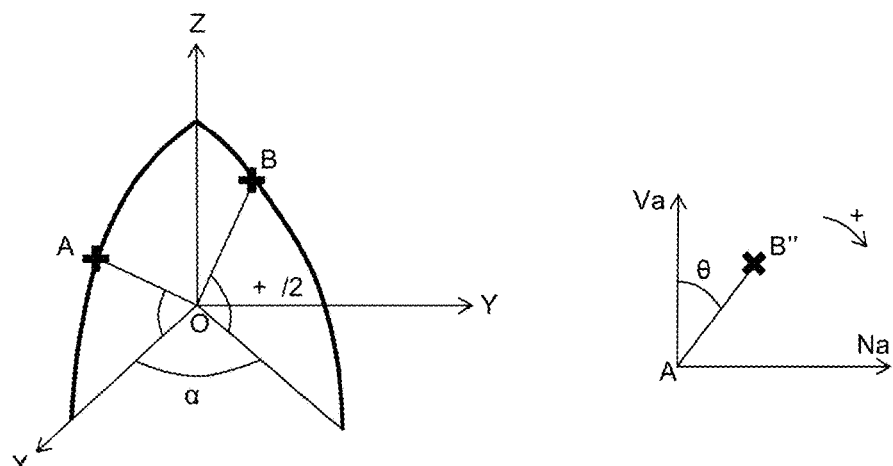
FIG. 6b illustrates the various angles between two satellites of one and the same constellation.

With reference to FIG. 6b, in the case of satellites of one and the same constellation, at the same altitude, in different planes, with an exactly polar inclination, it is possible to provide an analytical expression for the maximum azimuthal angle.

To this end, two satellites located at positions A and B, in two consecutive orbital planes separated by an angle α, are considered, and β/2 is taken as the phase angle between satellites. The frame of reference linked to the orbit of the satellite A is defined by:
- O: Earth's centre;
- X: direction of the ascending node A;
- Y: normal to the orbit;
- Z: normal to the plane (X,Y).

If the plane (A, Va, Na) is defined, in which Va represents the velocity of the satellite A and Na represents the normal to the orbit of A, and if B" is defined as the projection of B into the plane (A, Va, Na), the azimuthal angle denoted by θ, between Va and (AB"), defining the direction along which the satellite B is seen by the satellite A, is then given by the following expression:

$$\tan(\theta) = \frac{\cos(\lambda + \beta/2) * \sin(\alpha)}{\cos(\lambda) * \sin(\lambda + \beta/2) - \sin(\lambda) * \cos(\lambda + \beta/2) * \cos(\alpha)}$$

wherein:
- α is the separation between orbital planes, i.e. the angle in the equatorial plane (X, Y), between two consecutive orbital planes;
- β/2 is the phase angle between the first satellites of two consecutive planes;
- λ A is the position on the orbit of the satellite A.

Considering the above expression that defines the azimuthal angle θ, it should be noted that, as shown on FIG. 6a, θ varies between a maximum value $\theta_{Max}$ and a minimum value $\theta_{Min}$ which are functions of the positions allocated to the different satellites within the constellation.

Consequently, it is thus possible to determine the values of the sizing parameters of the inter-satellite communication device according to the invention defined above, i.e. the distance d between the two optical terminals of a same group (G1 or G2), their external diameter D and the diameter φ of the optical beam, such that the half-angle at the vertex $\theta_m$ of the field of regard is always larger than the maximum azimuthal angle.

Thus, in the case of a constellation corresponding to the example of FIG. 6a, each optical terminal 51 dedicated to inter-orbital plane communications 22, can for example have a field of regard such that the half-angle at the vertex $\theta_m$ of the latter, with respect to a straight line parallel to the direction of the trajectory of the satellite 10, is larger than the maximum azimuthal angle while remaining smaller than about 80°. This is for instance the case for any of the configurations illustrated by FIG. 5c.

Figure 6C:
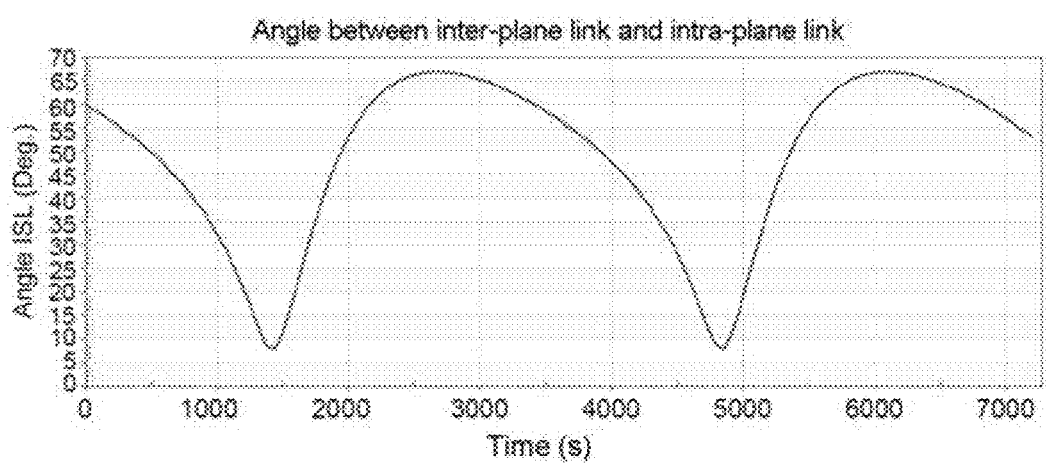
FIG. 6c is a graphical representation of the change in the angle between an inter-plane link and an intra-plane link of one and the same satellite as a function of time.

FIG. 6c illustrates the change, as a function of time, in the angle between the optical beam of an intra-plane link and that of an inter-plane link for one and the same satellite 10 in a configuration identical to the preceding configuration. This angle is at a maximum value when the satellite 10 is located at the Equator and is at a minimum value when the satellite 10 in the neighbouring orbital plane 25 crosses the satellite in question in the polar regions. The graph shows that for this configuration, regardless of the position of the satellite 10 in question on its orbit, the measurement of the angle between an intra-plane link 21 and an inter-plane link 22 is never less than a value of between 5° and 10°. Accounting for the divergence of the optical beams of the inter-satellite link 11 terminals 51, which is of the order of a few microradians to a few tens of microradians, this difference is enough for the optical beams not to be collinear and hence not to interfere with one another. Thus, the two links 21, 22 can be maintained together in the regions around the poles without the intra-plane and inter-plane links interfering with one another.

Figure 7:
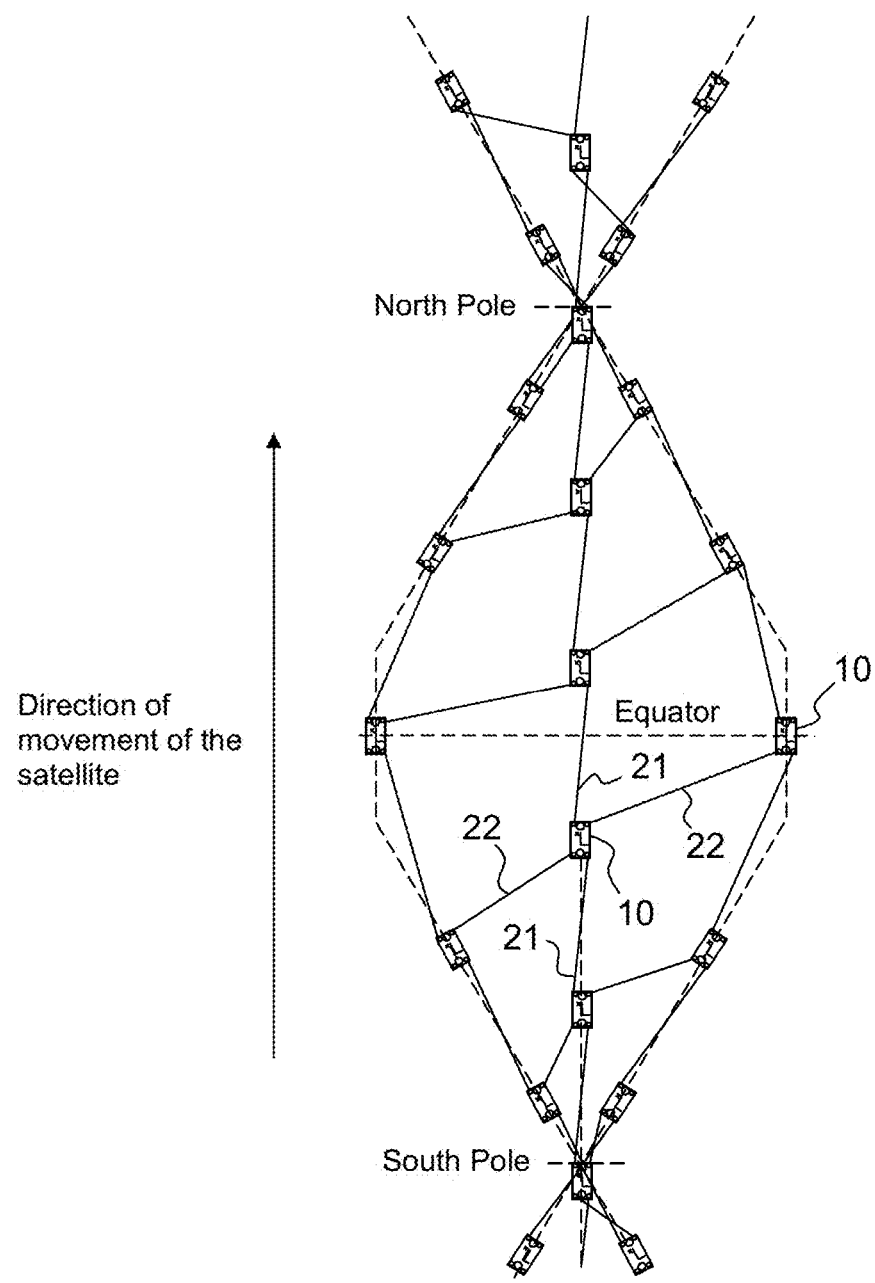
FIG. 7 illustrates an example of the change in the inter-satellite links using optical inter-satellite link terminals over the course of half an orbit between a region around the South Pole and a region around the North Pole.

FIG. 7 illustrates an example of the change in the inter-satellite links 11 using optical inter-satellite link terminals 51 according to the invention over the course of half an orbit between a region around the South Pole and a region around the North Pole.

Advantageously, when the satellite 10 crosses a pole, the inter-satellite links 11 are always maintained. Thus, it is not necessary to break the inter-orbital plane connection when the satellite approaches the region of a pole and then to re-establish it when it leaves this region. Thus, having to run through a potentially long aiming and acquisition phase, in which the probability of failure when re-establishing the link is non-zero, potentially making the procedure even longer, is avoided. Having to exchange information such as the relative positions of the satellites, ephemerides, etc. is also avoided.

There is no need to keep updating the connectivity of the constellation each time a pole is crossed and each optical terminal 51 always stays connected to the same optical terminal 51 of the neighbouring satellite 10. This may allow the architecture of the optical terminal 51 and/or equipment associated therewith to be simplified and hence the cost thereof to be decreased.

Similarly, the fact that the inter-satellite links 11 are maintained regardless of the position of the satellite 10 on its orbit makes it possible for the constellation always to provide a maximum bit rate for communications between subscribers on the ground.

Figure 8:
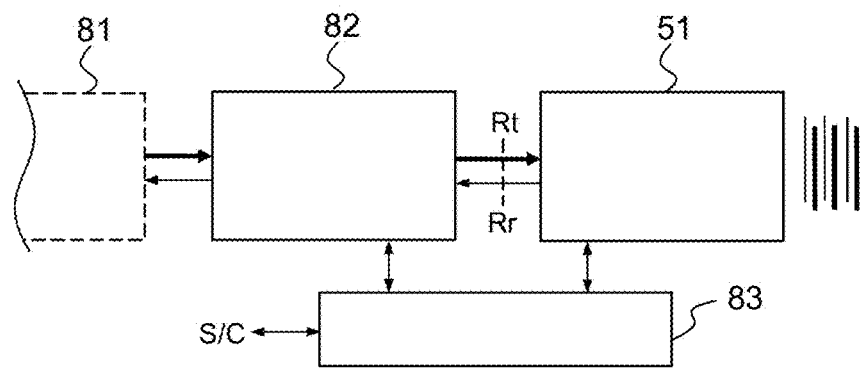
FIG. 8 shows an example of one embodiment of an optical inter-satellite link terminal with its associated electronics.

FIG. 8 is a possible functional representation of an optical inter-satellite link 11 terminal 51 according to the invention and the electronic equipment with which it interacts. The assembly may comprise a telecommunication processor 81 (or OBP for on-board processor) configured to deliver the telecommunication signals that are to be transmitted by the optical inter-satellite link 11 terminal 51 and receive the signals that said optical terminal 51 receives. This processor 81 may be connected to a laser communication unit 82 that is configured to transfer the signals optically. This unit 82 may comprise optical transmission and reception elements, amplification, pre-amplification, detection, modulation, demodulation, multiplexing, demultiplexing elements, etc. The laser communication unit is itself connected to the optical inter-satellite link terminal 51. The terminal 51 comprises the optical head and the beam pointing, acquisition and tracking (PAT) sub-assemblies of the optical terminal 51 with which it communicates. In order to control the laser communication unit 82 and the optical terminal 51, the assembly comprises a control unit 83. This control unit 83 is configured to interface between these units and the on-board computer in order to manage the power supplies and to coordinate the actions of the various units. Furthermore, there are various ways in which to organize these functions into hardware units. For example, the control unit may be common to multiple optical terminals and hence control multiple optical heads and multiple laser communication units.

Figure 9A:
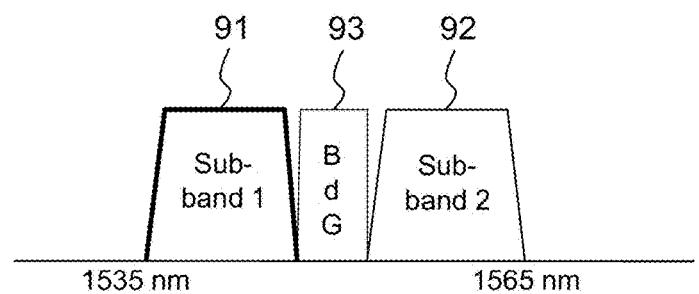
FIGS. 9a and 9b show an example of spectrum allocation and an example of use of the spectral band by the satellites of a constellation, respectively.

FIG. 9a shows an example of spectrum allocation in terms of wavelength for the optical terminals of an inter-satellite communication device according to the invention. The optical terminals 51 may employ the optical C- or L-bands.

Since each optical inter-satellite link 11 terminal 51 forms bidirectional links, the spectral band employed may be separated into two portions, into two sub-bands 91, 92. A guard band 93 is left unoccupied between the two sub-bands in order to avoid any interference.

According to one variant implementation, the two sub-bands 91, 92 may employ different polarizations. For example, a first sub-band may use right-hand polarization and the second sub-band may use left-hand polarization, or horizontal polarization and vertical polarization.

The optical terminals 51 of the inter-satellite communication device according to the invention may transmit and receive the optical beams differently. By way of example, the optical terminals 51 of a first group G1, G2 of terminals may use a first sub-band 91, 92 when transmitting and the second sub-band when receiving, whereas the terminals of the second group use the second sub-band 92 when transmitting and the first sub-band when receiving.

According to one mode of implementation, the optical terminals 51 of the first group G1 of terminals use a first type of polarization when transmitting and a second type of polarization when receiving, while the terminals of the second group G2 use the second type of polarization when transmitting and the first type of polarization when receiving.

Figure 9B:
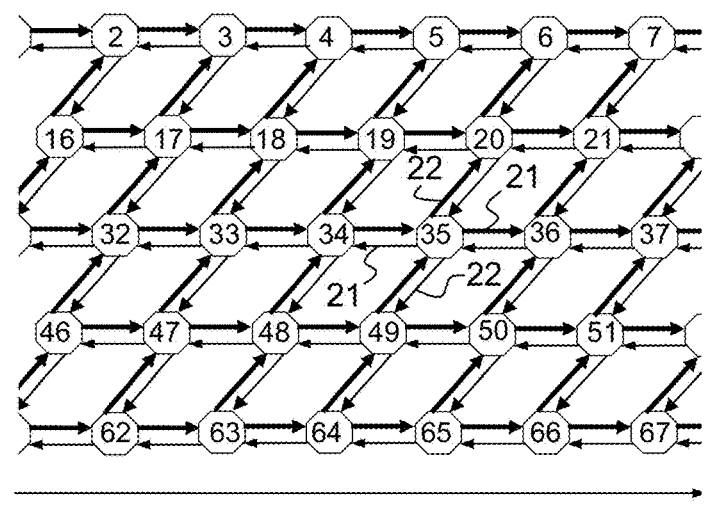

FIG. 9b illustrates an example of use of the sub-bands 91, 92 by the satellites within a constellation. If satellite number 35 is considered, for example, the optical terminals placed at the front of the platform transmit using the first sub-band 91 and those of the group placed at the rear of the platform transmit using the second sub-band 92. Upon reception, the optical terminals placed at the front use the second sub-band 92 and those placed at the rear use the first sub-band 91.

Figure 10:
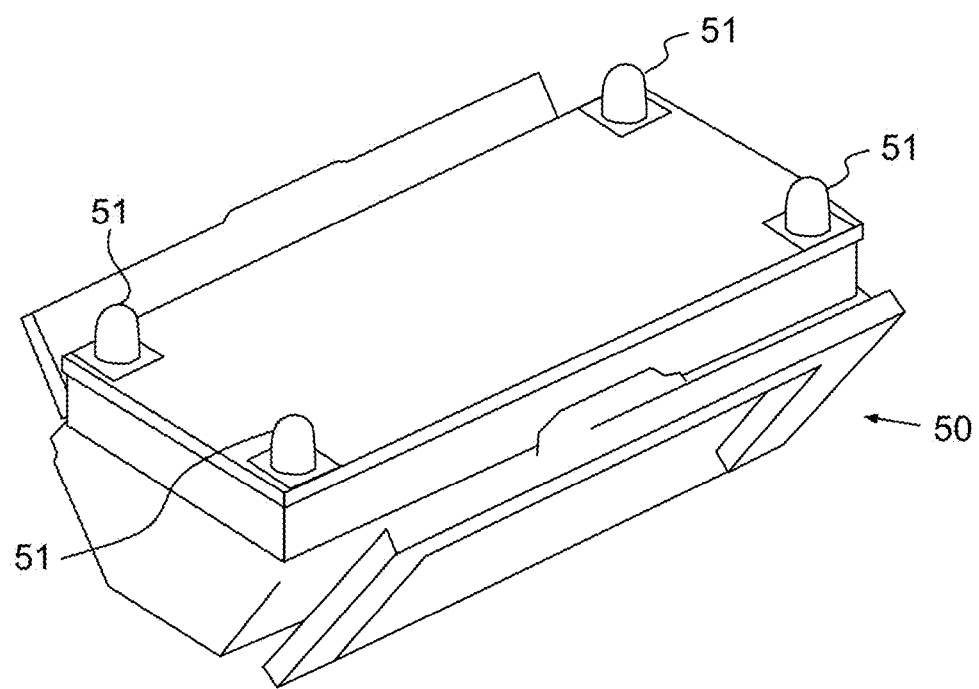
FIG. 10 shows an example of one embodiment of a satellite platform according to the invention.

Another subject of the invention is a satellite 10, for example a telecommunication satellite, comprising a satellite platform 50 on which an inter-satellite communication device as described above is positioned. By way of illustration, FIG. 10 shows an example of one embodiment of a platform of such a satellite according to the invention. In this non-limiting example, the four inter-satellite link terminals are placed at the four corners of the platform 30 so as to maximize the field of regard 53 of the terminals configured for the inter-orbital plane links.

These satellites may be configured to follow a non-geostationary orbit. This may be, for example, a low-Earth orbit, typically an orbit at an altitude of around 2 000 kilometers, or a medium-Earth orbit, i.e. an orbit at an altitude of between 2 000 and 36 000 kilometers.

Another subject of the invention is a constellation of satellites 10 according to the invention. This polar or near-polar constellation comprises multiple orbital planes 25 that cross one another in the polar regions, each plane 25 comprising multiple satellites 10 connected to one another by optical intra-plane 21 and/or inter-plane 22 links.

The invention claimed is:

1. An inter-satellite communication device for satellites configured to orbit within a constellation of satellites, a satellite comprising a satellite platform,
said device comprising a group of at least one optical terminal dedicated, under nominal conditions, to intra-orbital plane communication links and a group of at least one optical terminal dedicated, under nominal conditions, to inter-orbital plane communication links,
each optical terminal dedicated to intra-orbital plane communications being configured to transmit and receive optical signals with an optical terminal of an identical satellite orbiting in the same orbital plane,
each optical terminal dedicated to inter-orbital plane communications being configured to transmit and receive optical signals with an optical terminal of an identical satellite in an orbital plane that is adjacent over the entirety of its orbit in its orbital plane and
each optical terminal dedicated to inter-orbital plane communications being configured and arranged within the inter-satellite communication device so as to have a field of regard such that the half-angle at the vertex $\theta_m$ of the latter is larger than the maximum value of the azimuthal angle $\theta$ over a revolution around the Earth.

2. The device as claimed in claim 1, wherein said device comprises at least four optical inter-satellite link terminals,
a first group of two optical terminals being located at the front of said satellite and a second group of two optical terminals being located at the rear of said satellite,
each group of optical terminals comprising one optical terminal dedicated, under nominal conditions, to intra-orbital plane communication links and one optical terminal dedicated, under nominal conditions, to inter-orbital plane communication links,
the two optical inter-satellite link terminals of one and the same group being separated by a predetermined distance such that the optical beam of the inter-orbital plane communication link is never occulted by another optical terminal of the satellite platform during its orbit in the orbital plane.

3. The device as claimed in claim 2, wherein the two optical terminals of each group are placed in a position that is symmetrical with respect to an axis that is parallel to the direction of the trajectory of the satellite and passes through the centre of the platform.

4. The device as claimed in claim 1, wherein the optical terminals are identical and interchangeable.

5. The device as claimed in claim 1, wherein the intra-plane and inter-plane communication links are transmitted and received in a band of wavelengths that is divided into two sub-bands, the optical terminals of the first group transmitting optical beams in the first sub-band and receiving optical beams in the second sub-band, the optical terminals of the second group transmitting optical beams in the second sub-band and receiving optical beams in the first sub-band.

6. The device as claimed in claim 1, wherein the intra-plane and inter-plane communication links are transmitted and received with two different polarizations, the optical terminals of the first group transmitting optical beams with a first type of polarization and receiving optical beams with the second type of polarization, the optical terminals of the second group transmitting optical beams with the second type of polarization and receiving optical beams with the first type of polarization.

7. The device as claimed in claim 1, wherein optical beams are transmitted and received in the optical C-band.

8. The device as claimed in claim 1, wherein optical beams are transmitted and received in the optical L-band.

9. The device as claimed in claim 1, wherein the satellite follows a non-stationary orbit.

10. A satellite configured to orbit within a constellation of satellites distributed in multiple orbital planes, comprising a satellite platform on which an inter-satellite communication device according to claim 1 is positioned.

11. A constellation of satellites, comprising a plurality of satellites according to claim 10.

12. The constellation as claimed in claim 11, wherein said satellites follow a non-stationary orbit.

13. The constellation as claimed in claim 11, wherein said satellites follow a low Earth orbit.

14. The constellation as claimed in claim 11, wherein said satellites follow a medium Earth orbit.

\* \* \* \* \*